(12) United States Patent
Song et al.

(10) Patent No.: US 8,750,939 B2
(45) Date of Patent: Jun. 10, 2014

(54) METHOD OF CONTROLLING INSTANT MESSAGE AND MOBILE TERMINAL USING THE SAME

(75) Inventors: Chiwon Song, Seoul (KR); Jiyoun Lee, Seoul (KR); Kyunglack Kim, Seoul (KR); Jinwoo Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 681 days.

(21) Appl. No.: 12/368,050

(22) Filed: Feb. 9, 2009

(65) Prior Publication Data

US 2010/0099445 A1   Apr. 22, 2010

(30) Foreign Application Priority Data

Oct. 16, 2008 (KR) .................. 10-2008-0101745

(51) Int. Cl.
- *H04B 1/38* (2006.01)
- *H04M 1/725* (2006.01)
- *H04W 4/12* (2009.01)
- *H04M 1/02* (2006.01)

(52) U.S. Cl.
CPC ............ *H04M 1/72552* (2013.01); *H04W 4/12* (2013.01); *H04M 1/0214* (2013.01)
USPC .................. 455/566; 455/466; 455/575.3

(58) Field of Classification Search
CPC ..... H04W 4/12; H04W 4/14; H04M 1/72552; H04M 1/72519; H04M 1/0214
USPC ....................... 455/466, 566, 575.3
See application file for complete search history.

(56) References Cited

U.S. PATENT DOCUMENTS

| | | | |
|---|---|---|---|
| 5,285,493 A | 2/1994 | Wagai et al. | |
| 2002/0094826 A1 | 7/2002 | Lee | |
| 2002/0137551 A1* | 9/2002 | Toba | 455/566 |
| 2006/0009243 A1* | 1/2006 | Dahan et al. | 455/466 |
| 2006/0146011 A1* | 7/2006 | Pihlaja et al. | 345/156 |
| 2006/0234696 A1* | 10/2006 | Cho | 455/424 |
| 2007/0043822 A1* | 2/2007 | Brumfield | 709/207 |
| 2007/0195007 A1* | 8/2007 | Bear et al. | 345/1.1 |
| 2008/0028031 A1* | 1/2008 | Bailey et al. | 709/207 |
| 2009/0144655 A1* | 6/2009 | Hardy et al. | 715/803 |

FOREIGN PATENT DOCUMENTS

| | | |
|---|---|---|
| EP | 1 705 881 | 9/2006 |
| WO | WO 2004/011039 | 12/2004 |

OTHER PUBLICATIONS

European Search Report dated Feb. 3, 2010.

* cited by examiner

*Primary Examiner* — Charles Appiah
*Assistant Examiner* — Mazda Sabouri
(74) *Attorney, Agent, or Firm* — KED & Associates LLP

(57) ABSTRACT

A method and apparatus are provided for controlling instant messages. This may include a mobile terminal receiving a message, and searching a telephone directory stored in memory of the mobile terminal for sender information of the received message and determining the received message as an instant message according to a result of the search, and displaying text contents of the instant message on an idle screen of the mobile terminal for a specific duration of time that is controllable by a user.

17 Claims, 12 Drawing Sheets

METHOD OF CONTROLLING INSTANT MESSAGE AND MOBILE TERMINAL USING THE SAME

This application claims priority from Korean Application No. 10-2008-0101745, filed Oct. 16, 2008, the subject mater of which is incorporated herein by reference.

BACKGROUND

1. Field

Embodiments may relate to controlling instant messages on a mobile terminal.

2. Background

As functionality of terminals (e.g. personal computers, notebooks, and mobile phones) diversifies, the terminals have been implemented with multimedia players equipped with multiple functions, such as capturing images and video, playing music or video files, gaming, and reception of broadcast signals.

Terminals may include mobile terminals and stationary terminals based on whether the terminals are movable. Mobile terminals can be divided into handheld terminals and vehicle mount terminals according to whether they can be directly carried by a user.

Improvement of structural and/or software portions of the terminal may occur in order to support and increase functionality of the terminal. As terminals provide complex and various functions, a user interface (UI) including a menu display, a list display, etc. may become complicated.

A mobile terminal may receive not only general messages, but also urgent messages and/or public interest messages. A mobile terminal may recognize an urgent message as an instant message when the urgent message is received and the mobile terminal may display text contents of the message on an idle screen.

BRIEF DESCRIPTION OF THE DRAWINGS

Arrangements and embodiments may be described in detail with reference to the following drawings in which like reference numerals refer to like elements and wherein.

DETAILED DESCRIPTION

Embodiments may provide a method of controlling instant messages and a mobile terminal using the same, in which messages to be displayed in an instant message form can be easily selected.

A method of controlling instant messages may be provided that includes a mobile terminal receiving a message, searching a telephone directory that is stored in memory of the mobile terminal, for sender information of the received message and determining the received message as an instant message according to the search result. When the received message is the instant message, text contents of the instant message may be displayed on an idle screen of the mobile terminal for a specific duration that is controllable by a user.

A mobile terminal will now be described in detail with reference to the accompanying drawings. It is to be noted that the suffixes of constituent elements used in the following description, such as "module" and "unit", may be simply used by considering the easiness of writing this specification, but are not particularly given importance and roles. Accordingly, the terminologies "module" and "unit" may be mixed in use.

A mobile terminal may include a mobile phone, a smart phone, a notebooks computer, a terminal for digital broadcast, a personal digital assistant (PDA), a portable multimedia player (PMP), a navigator, and etc.

Figure 1:
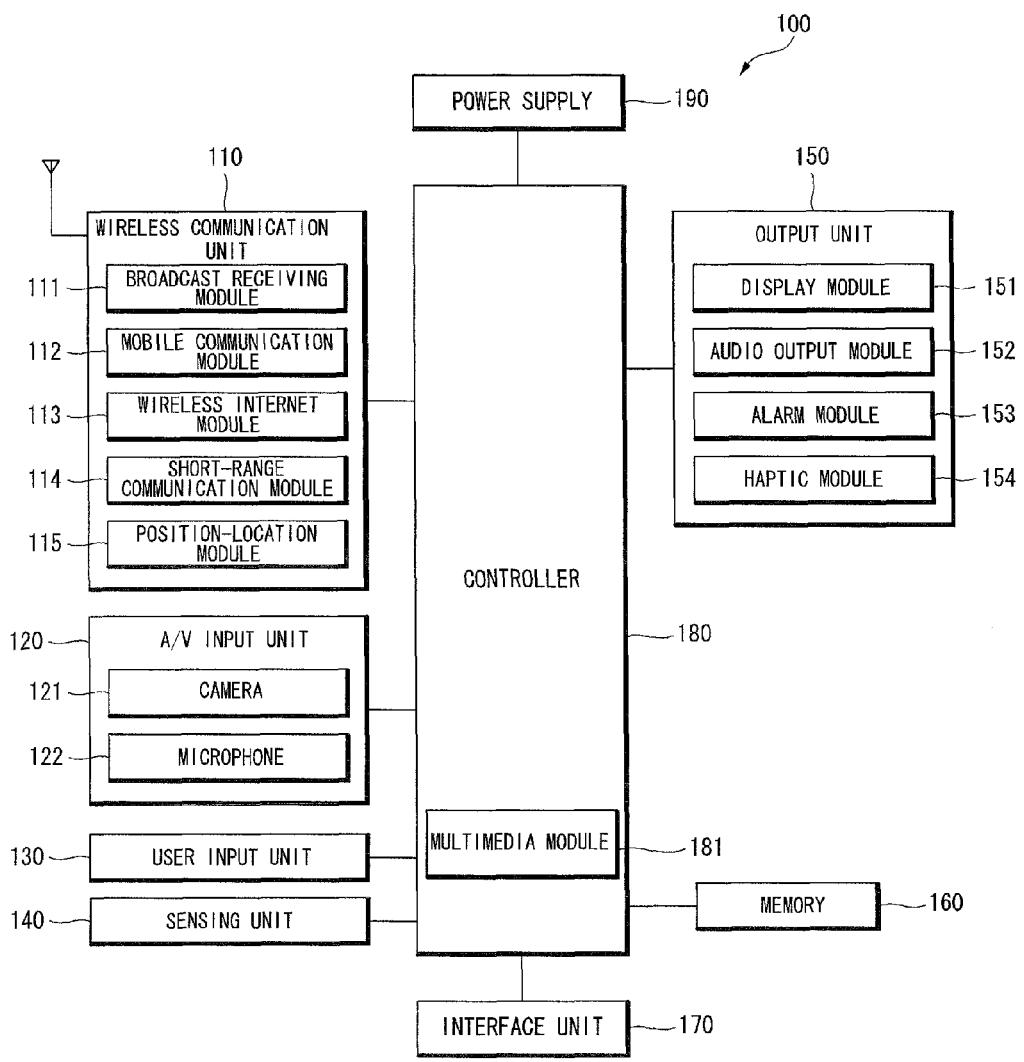
FIG. 1 is a block diagram of a mobile terminal in accordance with an example arrangement.

FIG. 1 is a block diagram of a mobile terminal according to an example arrangement. Other arrangements may also be used.

FIG. 1 shows that a mobile terminal 100 may include a wireless communication unit 110, an audio/video (A/V) input unit 120, a user input unit 130 (or user manipulation portion), a sensing unit 140, an output unit 150, a memory 160, an interface unit 170, a controller 180, a power supply 190, etc. Construction of the mobile terminal 100 is not limited to the components shown in FIG. 1, and the mobile terminal may be implemented to have more or less components according to functions added to or omitted from the mobile terminal.

The wireless communication unit 110 may include one or more components that permit wireless communication between the mobile terminal 100 and a wireless communication system or network within which the mobile terminal is located.

The wireless communication unit 110 may include a broadcast receiving module 111, a mobile communication module 112, a wireless Internet module 113, a short-range communication module 114, a position-location module 115, and etc.

The broadcast receiving module 111 may receive a broadcast signal and/or broadcast associated information from an external broadcast managing entity via a broadcast channel. The broadcast channel may include a satellite channel and a terrestrial channel. The broadcast managing entity may refer to a system that transmits a broadcast signal and/or broadcast associated information. The broadcast signal may include not only a TV broadcast signal, a radio broadcast signal, and a data broadcast signal, but may also include a broadcast signal in which a data broadcast signal is combined with a TV or radio broadcast signal.

Examples of the broadcast associated information may include information associated with a broadcast channel, a broadcast program, a broadcast service provider, etc. The broadcast associated information may be provided over a mobile communication network. The broadcast associated information may be received by the mobile communication module 112.

The broadcast associated information may be provided in various ways. For example, the broadcast associated information may include an electronic program guide (EPG) of digital multimedia broadcasting (DMB) and/or an electronic service guide (ESG) of digital video broadcast-handheld (DVB-H).

The broadcast receiving module 111 may receive broadcast signals transmitted from various types of broadcast systems. For example, the broadcast receiving module 111 may receive digital broadcast signals using digital broadcast techniques, such as digital multimedia broadcasting-terrestrial (DMB-T), digital multimedia broadcasting-satellite (DMB-S), media forward link only (MediaFLO®), digital video broadcast-handheld (DVB-H), and/or integrated services digital broadcast-terrestrial (ISDB-T). The broadcast receiving module 111 may be suitable for other broadcast systems that provide broadcast signals, as well as the digital broadcast systems.

Broadcast signals and/or broadcast associated information received through the broadcast receiving module 111 may be stored in the memory 160. The mobile terminal 100 may receive 3D map data and 3D object detailed information through the broadcast receiving module 111 connected to a broadcast receiving channel and store the data in the memory 160.

The mobile communication module 112 may transmit/receive wireless signals to/from one or more network entities (e.g., base stations, external terminals, servers). Such wireless signals may include audio, video, text/multimedia, control signaling, and/or data, for example.

The wireless Internet module 113 may support Internet access for the mobile terminal 100. The wireless Internet module 113 may be internally or externally coupled to the mobile terminal 100. Wireless Internet technologies may include wireless LAN (WLAN) (Wi-Fi), wireless broadband (Wibro), world interoperability for microwave access (Wimax), and/or high-speed downlink packet access (HSDPA), for example.

The short-range communication module 114 may facilitate relatively short-range communications. Suitable technologies for implementing the short-range communication module 114 may include Bluetooth, radio frequency identification (RFID), infrared data association (IrDA), ultra-wideband (UWB), and/or ZigBee, for example.

The position-location module 115 may identify or otherwise obtain a location of a mobile terminal. The position-location module 115 may be implemented using a global positioning system (GPS). The position-location module 115 may calculate 3D position information according to latitude, longitude, and altitude with respect to one point (object) on a specific duration by calculating information about distance of the one point (object) from three or more satellites and information about time when the distance information was measured and then applying trigonometry to the calculated distance information. Alternatively, a method of calculating position and time information may be used by using three satellites and by modifying an error of the calculated position and time information using another satellite. The position-location module 115 may also continue to calculate a current location in real-time and calculate velocity information based on the current location.

The A/V input unit 120 may receive audio or video signals input to the mobile terminal. As shown, the A/V input unit 120 may include a camera 121 and a microphone 122. The camera 121 may process image frames of still pictures and/or video obtained by an image sensor in a video call mode or a photographing mode. The processed image frames may be displayed on a display module 151 (of the output unit 150).

The image frames processed in the camera 121 may be stored in the memory 160 or may be transmitted to outside of the mobile terminal 100 through the wireless communication unit 110. Two or more cameras 121 may also be included.

The microphone 122 may receive an external audio signal while a mobile terminal is in a mode, such as phone call mode, a recording mode and a voice recognition mode and may process the received audio signal into electrical voice data. The processed voice data may be converted into a form that can be transmitted to a mobile communication base station through the mobile communication module 112 in the phone call mode, and may then be output. A variety of noise removing algorithms (or noise canceling algorithms) for removing noise generated in course of receiving external audio signals may be implemented in the microphone 122.

The user input unit 130 may generate input data for controlling an operation of the terminal 100. The user input unit 130 may include a keypad, a dome switch, a touchpad, a jog wheel and/or a jog switch. The user input unit 130 may also include a trackball, a joystick and etc.

The sensing unit 140 may sense a current status of the mobile terminal 100 and may generate a sensing signal for controlling operation of the mobile terminal 100. For example, the sensing unit 140 may detect an open/close status of the mobile terminal 100, a position of the mobile terminal 100, presence or absence of user contact with the mobile terminal 100, an orientation of the mobile terminal 100, acceleration/deceleration of the mobile terminal 100, a posture of the mobile terminal 100, a change in angle of the mobile terminal 100 and etc. The sensing unit 140 may also generate sensing signals that are related to whether the power supply 190 supplies power, whether the interface unit 170 is connected with external devices, etc.

The sensing unit 140 may include a touch screen having a touch sensor that is built in the display module 151 or is stacked on the display module 151, and a proximity sensor for sensing whether an object exists within a proximity distance within which the object can be recognized on the display module 151 or the touch screen and sense motion or gesture of the object. The sensing unit 140 may also include a gyro sensor, a geomagnetic sensor, etc. for sensing a change in posture, orientation, angle, etc. of the mobile terminal 100.

The output unit 150 may generate outputs associated with the sense of sight, the sense of hearing, tactile sense, etc. and may include the display module 151, an audio output module 152, an alarm module 153, a haptic module 154, etc.

The display module 151 may display and output information processed in the mobile terminal 100. For example, the display module 151 may display a user interface (UI), a 2D or 3D graphic user interface (GUI), etc. under control of the controller 180. When the mobile terminal 100 is in a video call mode or the photographing mode, the display module 151 may display images captured by the camera 121 or images received through the wireless communication unit 110.

The display module 151 may be implemented using known display technologies including a liquid crystal display (LCD), a thin film transistor-liquid crystal display (TFT-LCD), an organic light-emitting diode display (OLED), a flexible display and/or a 3D display, for example.

The display module 151 may have a transparent type or a light-transmitting type that enables the outside to be viewable through a display panel. In this case, a user can view a thing located at a rear of the terminal body through an area occupied by the display module 151 of the mobile terminal body.

A plurality of the display modules 151 may include two or more display modules that are physically or logically divided. For example, the plurality of display modules 151 may be provided (or disposed) on one face of the mobile terminal 100 integrally or with the display module 151 being spaced apart from each other or provided on different faces of the mobile terminal 100. A touch screen may be implemented such that a touch sensor is stacked on the display module 151 or is embedded in the display module 151. The touch screen may also be used as an input device for receiving user inputs in addition to an image output device.

The touch sensor may convert a change in pressure applied to a specific portion of the display module 151, electrostatic capacitance generated from a specific portion of the display module 151, and so on into an electrical input signal. The touch sensor may sense not only a position and an area touched by the touch sensor, but also pressure upon touch. When there is a touch input to the touch sensor, a corresponding signal(s) may be sent to a touch signal processing module (not shown) of the controller 180. The touch signal processing module may calculate coordinates of the touch point based on the touch signal and transmit the calculated coordinates to the controller 180. The controller 180 may determine which point on the touch screen has been touched. When the touch sensor is implemented using an electrostatic touch sensor, the touch sensor can sense proximity to a point based on variation in an electric field according to approach to the point. The touch screen may be considered a proximity sensor.

A proximity sensor may be positioned in an internal area of the mobile terminal 100 or near the touch screen. The proximity sensor may refer to a sensor for sensing objects approaching a detection surface or whether objects exist nearby employing electromagnetic force or infrared rays without mechanical contact. The proximity sensor may have a longer lifespan than a contact type sensor and the proximity sensor may also have an increased efficiency. Examples of the proximity sensor may include a transmit type photoelectric sensor, a direct reflection type photoelectric sensor, a mirror reflection type photoelectric sensor, a high-frequency oscillation type proximity sensor, an electrostatic capacitance type proximity sensor, a magnetic type proximity sensor, an infrared proximity sensor, and/or etc.

The proximity sensor may sense a proximity touch action and a proximity touch pattern including, for example, a proximity touch distance, a proximity touch direction, a proximity touch speed, a proximity touch time, a proximity touch position, a proximity touch moving status, and etc. Information corresponding to a sensed proximity touch operation and a proximity touch pattern may be output on a touch screen.

The audio output module 152 may output audio data that is received from the wireless communication unit 110 in various modes including, for example, in a call receiving mode, a phone call mode, a recording mode, a voice recognition mode and/or a broadcast receiving mode. The audio data may be stored in the memory 160. The audio output module 152 may output audio signals relating to a particular function (e.g., call received and message received, etc.) that is performed in the mobile terminal 100. The audio output module 152 may include a receiver, a speaker, a buzzer and etc.

The alarm module 153 may output signals to inform an occurrence of events in the mobile terminal 100. For example, events occurring in the mobile terminal 100 may include signals, including call-received signals and message-received signals, a key entry signal, a touch input, and etc. The alarm module 153 may also output signals informing an occurrence of events in different ways (e.g. vibration) other than audio or video signals. The video or audio signals may also be output through the display module 151 or the audio output module 152. The alarm module 153 may output an effect sound or a vibration pattern that is generated when an instant message is received, and the effect sound or vibration pattern may be different from a sound or vibration that is generated when a general message is received.

The haptic module 154 may generate a variety of haptic effects that can be felt by a user. One of the representative examples of the haptic effects that are generated by the haptic module 154 may include vibration. An intensity, a pattern, etc. of a vibration generated by the haptic module 154 may be controlled. For example, different vibrations may be combined or output or different vibrations may be output sequentially. The haptic module 154 may generate various haptic effects including, but not limited to, an effect caused by stimulus of arrangements of pins that contact a skin surface, an effect caused by a stimulus through spraying force or suction force of air via an injection nozzle or an inlet port, an effect caused by a stimulus passing over the skin surface, an effect caused by a stimulus through contact of an electrode, an effect caused by a stimulus employing electrostatic force, an effect caused by reappearance of a feeling of cold and/or warmth employing an element that may absorb and/or generate heat, and so on in addition to the above vibration effect. Other haptic effects may also be provided by the haptic module 154. The haptic module 154 may not only transfer the haptic effects through direct contact, but may provide the haptic effects through myestheia by a user's finger, arm, etc. The haptic module 154 may output a haptic pattern that is generated when an instant message is received, differently from a haptic pattern that is generated when a general message is received.

The memory 160 may store programs for processing an overall control operation of the controller 180, a variety of software type applications, and/or various data, such as a telephone directory (phonebook), messages, e-mails, pictures, and video that are input and output. The memory 160 may also store data associated with various patterns of effect sounds, vibration patterns, and haptic patterns that are output when a user input or an event is generated. The memory 160 may be implemented using at least one type of storage media including a flash memory type, a hard disk type, a multimedia card microphone type, a card type memory (e.g., SD or XD memory, etc.), a random access memory (RAM), a static random access memory (SRAM), a read-only memory (ROM), an electrically erasable programmable read-only memory (EEPROM), a programmable read-only memory (PROM) a magnetic memory, magnetic disk, and/or an optical disk. The mobile terminal 100 may operate in association with a web storage that performs a storage function of the memory 160 on the Internet.

The interface unit 170 may couple the mobile terminal 100 with external devices. The interface unit 170 may receive data or power from the external devices and transfer the data or power to each component within the mobile terminal 100 or transmit data within the mobile terminal 100 to the external devices. For example, a wired/wireless headset port, an external charger port, a wired/wireless data port, a memory card port, an identity module card port, an audio input/output (I/O) port, a video I/O port, an earphone port, and so on may be included as part of the interface unit 170. The interface unit 170 may be a passage through which power from an external cradle is supplied to the mobile terminal 100 when the mobile terminal 100 is coupled to the cradle or a passage through which a variety of command signals input from the cradle by a user are transferred to the mobile terminal 100. The variety of command signals or power input from the cradle may operate as signals for recognizing that the mobile terminal 100 has been correctly provided (or mounted) in the cradle.

The identity module may be a chip in which various pieces of information for authenticating a use authority of the mobile terminal 100 are stored and may include a user identity module (JIM), a subscriber identity module (SIM), a universal subscriber identity module (USIM) and etc. The identity module may be fabricated in a smart card form. The identity module may be connected to the mobile terminal 100 via the identity module port of the interface unit 170. The identity module may store telephone numbers, call history information, billing information and the like.

The controller 180 may control overall operations of the mobile terminal 100. For example, the controller 180 may perform control and processing associated with voice calls, data communications, video calls, message transmission/reception, etc. The controller 180 may include a 3D image processing module (not shown) and a multimedia module 181. The 3D image processing module may convert 3D data, such as 3D map data and 3D user interface data, into a 3D image, and control an angle, a size, etc. of a 3D image displayed on the display module 151 in response to a direction switch command according to a user input or variation in the angle of the mobile terminal 100. The multimedia module 181 may perform (and be responsible for) a signal processing for playing multimedia data. The controller 180 may perform a pattern recognition process for recognizing a writing input and figure drawing input performed on a touch screen as characters and an image, respectively.

The controller 180 may display contents of an instant message on the display module 151 for a specific duration of time (or period) from when the instant message is received. The specific duration of time may be determined and/or set by a user. An instant message may include a message received from a group constituent member of a telephone directory (or phonebook) who is designated by a user. The controller 180 may execute an instant message setting application in order for a user to select an instant message sender group within a telephone directory. The controller 180 may prompt a user to select a display module on which an instant message will be displayed and a form of the instant message display. A user can register, modify and/or delete an instant message sender group in the telephone directory stored in the mobile terminal 100 and may designate a display form of an instant message and a display module on which the instant message will be displayed.

A message received by the mobile terminal 100 may include a control code. This control code may include a message kind control code and a message display control code. The message kind control code may indicate whether a message (to which the corresponding control code is attached) is an instant message or a general message. The message display control code may indicate a display position of an instant message. When a message having the control code is received, the controller 180 can determine whether the received message will be displayed in an instant message form or will be displayed in a general message form by analyzing the message kind control code. The controller 180 may also control the display position of an instant message by analyzing the message display control code.

The power supply 190 may be applied with an external power and/or internal power and may supply the power to respective constituent elements under control of the controller 180.

Embodiments described herein may be implemented in a computer or similar device-readable medium using, for example, software, hardware, or some combination thereof.

For a hardware implementation, embodiments may be implemented using application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, and/or a selective combination thereof. Embodiments may be implemented by the controller 180.

For a software implementation, embodiments such as procedures and functions may be implemented with separate software modules, each of which may perform one or more of the functions and operations described herein. Software codes may be implemented with a software application written in any suitable programming language and may be stored in the memory 160 and executed by the controller 180.

Figure 2A:
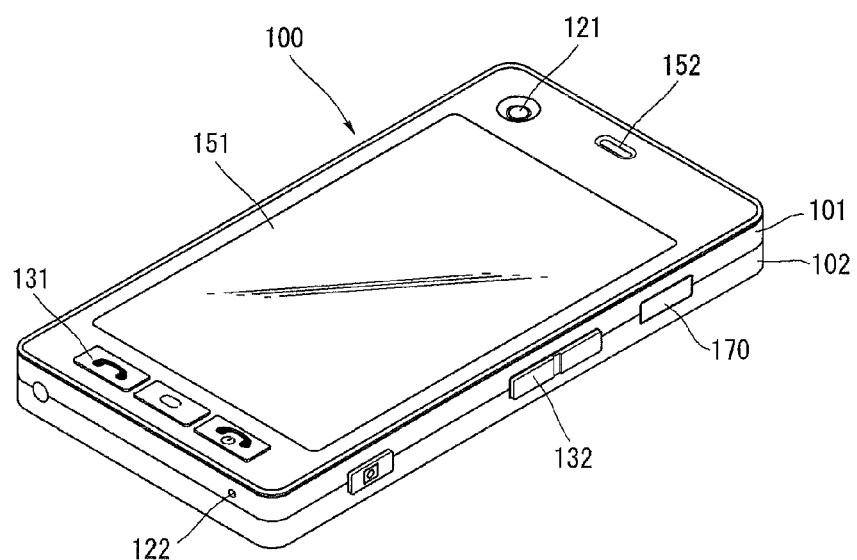
FIG. 2A is a perspective view of a front of the mobile terminal according to an example arrangement.
Figure 2B:
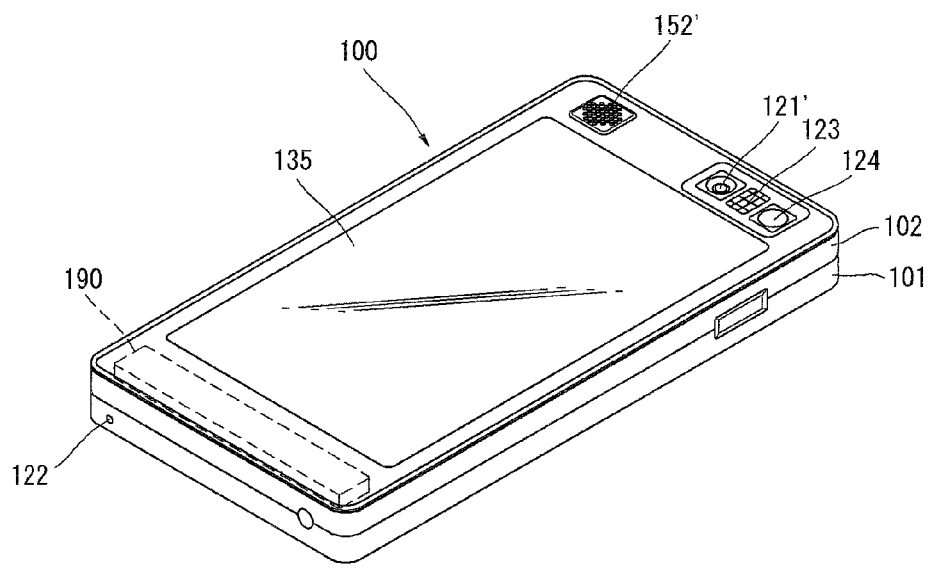
FIG. 2B is a perspective view of a rear of the mobile terminal according to an example arrangement.

FIG. 2A is a perspective view of a front of the mobile terminal according to an example arrangement. FIG. 2B is a perspective view of a rear of the mobile terminal according to an example arrangement. Other arrangements may also be provided.

As shown in FIGS. 2A and 2B, a body of the mobile terminal 100 may include a case (a casing, housing, cover, etc.). The case may be divided into a front case 101 and a rear case 102. A variety of electronic components may be embedded in a space formed by the front case 101 and/or the rear case 102. One or more intermediate cases may be further provided between the front case 101 and the rear case 102. The cases may be formed from injection molded plastic, or may be formed using metallic material such as stainless steel (STS) and titanium (Ti).

The display module 151, the audio output unit 152, the camera 121, the user input unit (i.e., a first input unit 131 and a second input unit 132), the microphone 122, the interface unit 170, etc. may be disposed in or provided on the front case 101.

The display module 151 may occupy a greater part of a main surface of the front case 101. The audio output unit 152 and the camera 121 may be provided in an area adjacent to one of both ends of the display module 151, and the first input unit 131 and the microphone 122 may be provided in an area adjacent to the other end of the display module 151. The second input unit 132, the interface unit 170, etc. may be provided on sides of the front case 101 and the rear case 102.

The user input unit 130 may be manipulated in order to receive commands for controlling operations of the mobile terminal 100 and may include the first and second input units 131 and 132. The first and second input units 131 and 132 may adopt any kind of input method as long as it is a tactile manner that allows a user to manipulate the first and second input units 131 and 132 while feeling a tactile sensation. For example, the first and second input units 131 and 132 may include a keypad, a dome switch, a touchpad, a jog wheel, a jog switch, a track ball, a joystick and/or etc.

Contents input by the first and second units 131 and 132 may be set in various ways. For example, the first input unit 131 may receive commands, such as start, stop, and scroll, and the second input unit 132 may receive commands, such as volume control of audio output from the audio output unit 152 and switching of the display module 151 to a touch recognition mode. The input units 131, 132 may include a key designated for map display and an input (or manipulating) unit designated to select and control an object of a map.

A camera 121' may be further mounted to or on the rear case 102. The camera 121' may face a direction that is substantially opposite to a direction faced by the camera 121 and the camera 121' may have pixels different from the camera 121. For example, the camera 121 may operate with a relatively lower resolution sufficient enough to capture an image of a user's face and to transmit the captured image to a counterpart in video calls or the like. The camera 121' may operate with a relatively higher resolution that is useful for obtaining higher quality pictures for later use or for communicating to others. The cameras 121 and 121' may be installed in the terminal body in such a way as to be rotated or popped up.

A flash 123 and a mirror 124 may be further provided adjacent to the camera 121'. The flash 123 may irradiate light to a subject when the subject is photographed by the camera 121'. The mirror 124 may assist a user to position the camera 121 in a self-portrait mode.

An audio output unit 152' may be provided on the rear side of the rear case 102. The audio output unit 152' may implement a stereo function together with the audio output unit 152 of the front side and may be used to implement a speakerphone mode at a time of calls.

An antenna for receiving broadcast signals in addition to an antenna for calls, etc. may be further provided on a side of the mobile terminal body. The antenna, constituting a part of the broadcast receiving module 111, may be configured to retract into the mobile terminal body.

The power supply 190 for supplying power to the mobile terminal 100 may be provided in the mobile terminal body. The power supply 190 may be configured within the mobile terminal body or may be provided external to the mobile terminal body in such a way as to be directly detachable therefrom.

A touch pad 135 for sensing touch may be further provided (or mounted in) the rear case 102. The touch pad 135 may be a light-transmitting type in a same manner as the display module 151. When the display module 151 is configured to output sight information from both sides, the sight information may also be recognized even through the touch pad 135. Information output to both sides of the display module 151 may be all controlled by the touch pad 135. Alternatively, a display may be further mounted in the touch pad 135 and, therefore, a touch screen may be provided in the rear case 102.

The touch pad 135 may operate in conjunction with the display module 151 of the front case 101. The touch pad 135 may be provided on the rear side of the display module 151 and in parallel to the display module 151. The touch pad 135 may have a size that is identical to or smaller than the display module 151.

The mobile terminal 100 may be implemented in a variety of different configurations, such as a bar-type, a slide-type in which two or more bodies are relatively movable, a folder-type, a swing-type, a swivel type, and/or combinations thereof.

The mobile terminal 100 may include one or more display modules 151 for displaying a current status of the mobile terminals, an occurrence of an event, and various functions to a user. The display module 151 may be logically or physically divided as described above. FIGS. 3(*a*)-3(*d*) show examples of a mobile terminal having two display screens in which the display module is physically divided.

FIGS. 3(*a*)-3(*d*) show that the display module 151 may include first and second display modules that are divided physically and displayed on different faces or different bodies of the mobile terminal.

In a folder or slide-type mobile terminal, an upper body may be coupled to a lower body by way of a hinge or a sliding unit such that the mobile terminal may be provided in an opened-position (or mode) and/or a closed position (and/or mode). In this type of mobile terminal, a first display module may have its display screen exposed to an inner surface that faces the lower body, in the upper body or inner surfaces that face each other, in the upper body and/or in the lower body. A second display module may be an external display module and may have its display surface exposed to an outer surface of the upper body. Most information may be displayed on the first display module and brief information may be displayed on the second display module.

An auxiliary display module may also be coupled to the mobile terminal. The auxiliary display module may be fabricated separately from the mobile terminal and may be detachably coupled to the mobile terminal. The auxiliary display module may display data supplied thereto under control of the controller.

Figure 3A:
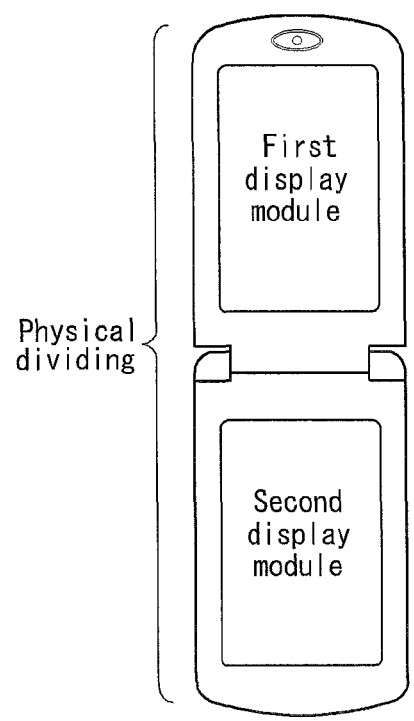
FIGS. 3A-3D show examples of a mobile terminal having two display screens.
Figure 3B:
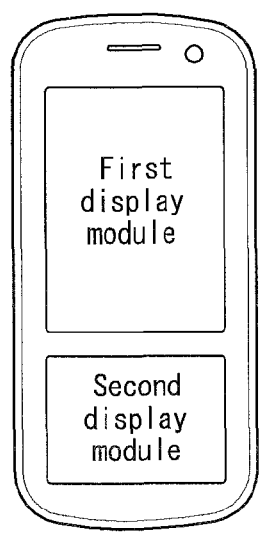
Figure 3C:
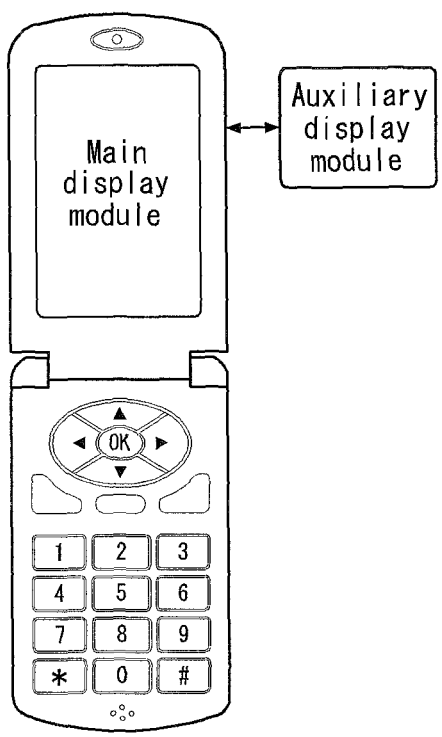
Figure 3D:
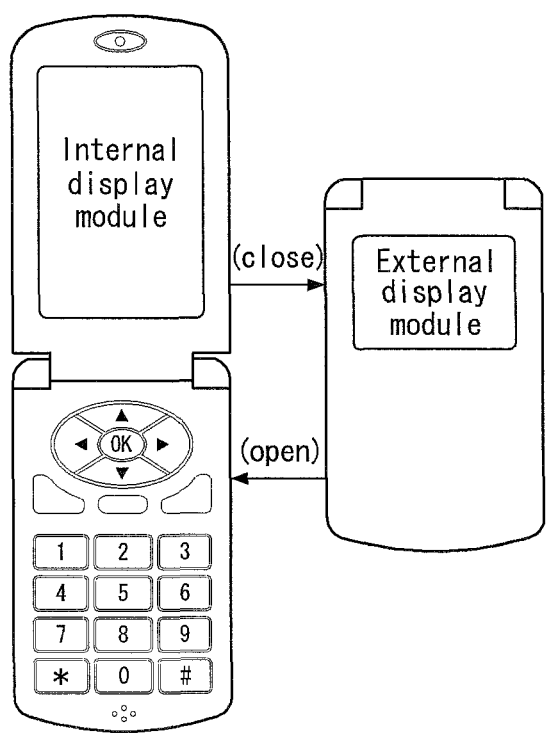

FIG. 3A shows a first display module on a folder of the mobile terminal and a second display module on a body of the mobile terminal. FIG. 3B shows a first display module and a second display module on one side (front or rear) of the mobile terminal. FIG. 3C shows a main (or first) display module on a folder of the mobile terminal and an auxiliary display module (i.e., a second display module) that may be coupled to the body (or folder) of the mobile terminal. FIG. 3D shows an internal display module (i.e., a first display module) on a folder of the mobile terminal and an external display module (i.e., a second display module) that may be coupled to the body (or folder) of the mobile terminal. Each of the configurations shown in FIGS. 3A-3D may also be implemented in a slide-type mobile terminal.

When the mobile terminal receives an instant message, contents of the instant message may be displayed on an idle screen of a first display module for a specific duration of time. When the mobile terminal is a folder or slide-type and has its upper body folded to its lower body (in a closed state), the controller 180 may not display the instant message on a first display module in which a display screen is not exposed, but rather the controller may display the instant message on an external display module that is exposed to the outside (or on a second display module in which a display screen is exposed to the outer surface of the body) according to a user's choice or based on an analysis of a message display control code included in the instant message. When an auxiliary display module is coupled to a mobile terminal and upper and lower bodies of the mobile terminal are folded together (in a closed state) so that a display screen of a main display module is not exposed, the controller 180 may display the instant message on the auxiliary display module according to a user's choice or based on analyzing a message display control code included in the instant message.

Figure 4:
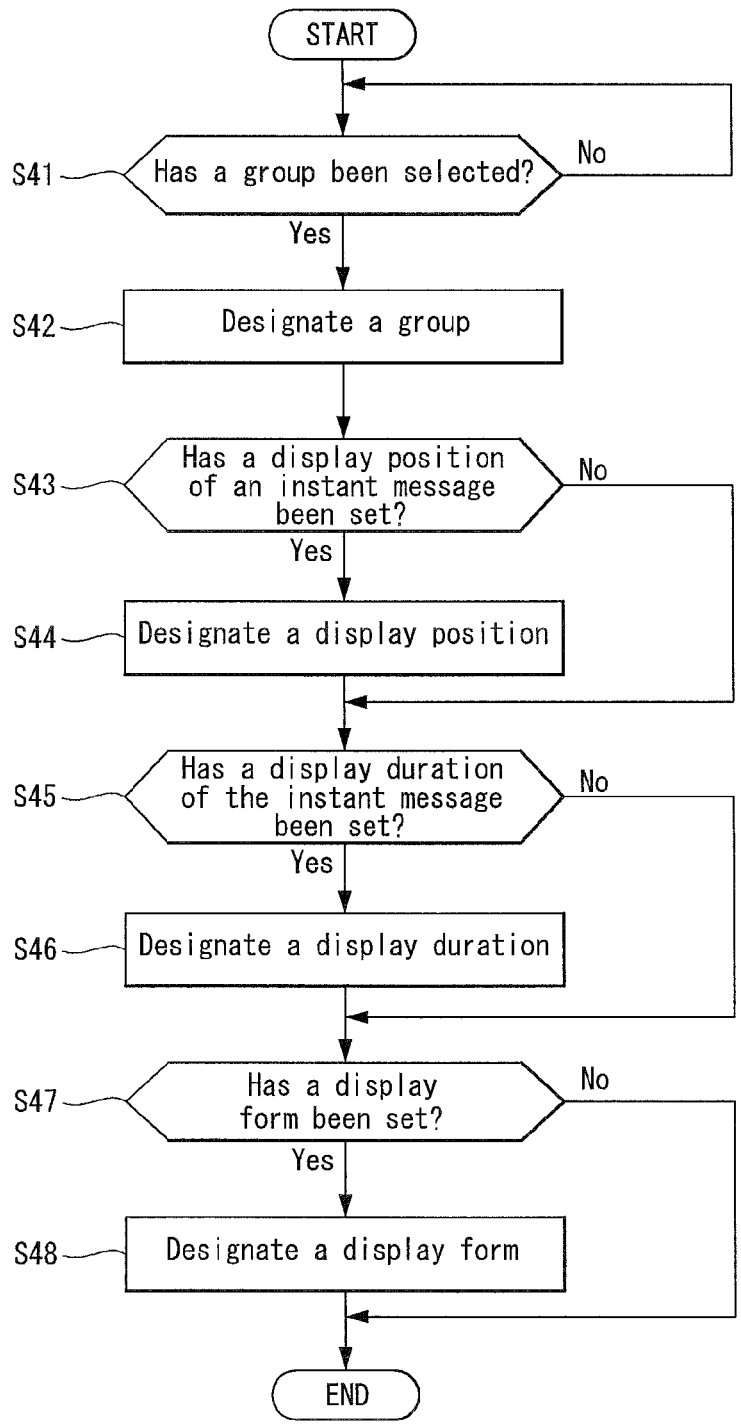
FIG. 4 is a flowchart showing a method of setting an instant message in a mobile terminal in accordance with an example embodiment of the present invention.

FIG. 4 is a flowchart showing a method of setting an instant message in a mobile terminal in accordance with an example embodiment of the present invention. Other operations, orders of operations and embodiments may also be provided. This method may be executed under control of the controller 180.

When a user selects setting of an instant message in a menu screen displayed on the mobile terminal 100, the controller 180 may execute a search of a telephone directory application. The user may select groups, in operation S41, that will be designated, in operation S42, as instant message sender groups from the telephone directory groups executed in the mobile terminal. For example, the instant message sender groups that can be designated by a user may include a family, a friend, a work place, etc.

The controller 180 may display, on the display module 151, a position at which the instant message will be displayed (i.e., a menu screen for guiding the user to choose the display module 151). In operation S43 and S44, the user can select (or designate) a position at which the instant message will be displayed by using the menu screen. This may designate a display position of the instant message. If the mobile terminal 100 only includes one display module 151, the display position of an instant message can be selected within a display screen of the display module 151. If the mobile terminal 100 includes two or more display modules that are physically or logically divided, then the display position of an instant message can be any one of the display modules and can be selected within a display screen of the selected display module.

The controller 180 may display a menu screen for guiding the user to input a display duration of the instant message on the display module 151. In operations S45, S46, the user can select (or designate) the display duration of the instant message by using the menu screen. This may designate a display duration of the instant message. As one example, the user may set the instant message display duration to 10 seconds and the mobile terminal may receive an instant message, then the instant message may be continuously displayed on an idle screen of a display module that is designated as an instant message display position for 10 seconds from a time when the instant message is received at the mobile terminal.

The controller 180 may display a menu screen for guiding the user to select a display form of the instant message on the display module 151. In operations S47, S48, the user can select (or designate) the display form of the instant message by using the menu screen. A font, a color, a degree of background transparency, etc. of the instant message may be selected according to the display form selected by the user. Further, a motion of the instant message (such as sliding, rolling, and/or flickering) can be selected, and/or the instant message may be displayed in the form of a banner or ticker based on the display form selected by the user.

Figure 5:
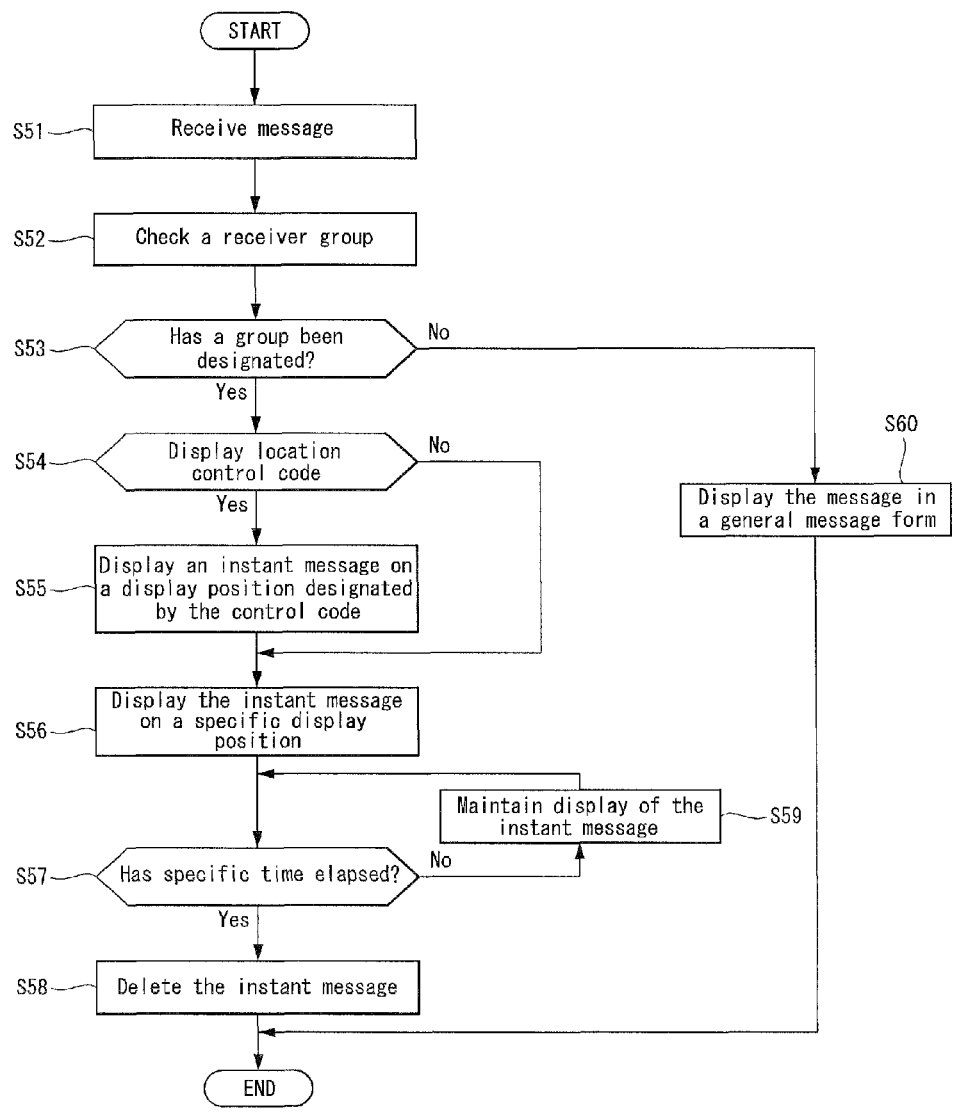
FIG. 5 is a flowchart showing a method of controlling an instant message received at a mobile terminal in accordance with an example embodiment of the present invention.

FIG. 5 is a flowchart showing a method of controlling an instant message received at a mobile terminal according to an example embodiment. Other operations, orders of operations and embodiments may also be provided. The control method may be described with respect to FIGS. 6A-6C and 7A-7C. This control method may be executed under control of the controller 180.

As shown in FIG. 5, a message may be received in operation S51. The controller 180 may then search a telephone directory for a message sender in order to determine the message sender. That is, the controller 180 may check a receiver group in operation S52. If the message sender belongs to an instant message sender group designated by a user (as determined in operation S53), then a determination may be made in operation S54 whether a location control code is provided. If the location control code is provided, then the recognized instant message may be displayed in operation S56 at a display position designated by the control code. In operation S56, the instant message may be displayed on an idle screen (STB) of the display module 151 according to a display position and a display form that have been selected by the user.

In operation, the controller 180 may determine whether a specific amount of time for displaying the instant message has elapsed. If the specific amount of time has not elapsed, then the controller 180 may maintain the display of the instant message in operation S59. If the specific amount of time has elapsed, then the instant message may be deleted or removed form the display in operation S58.

Figure 7A:
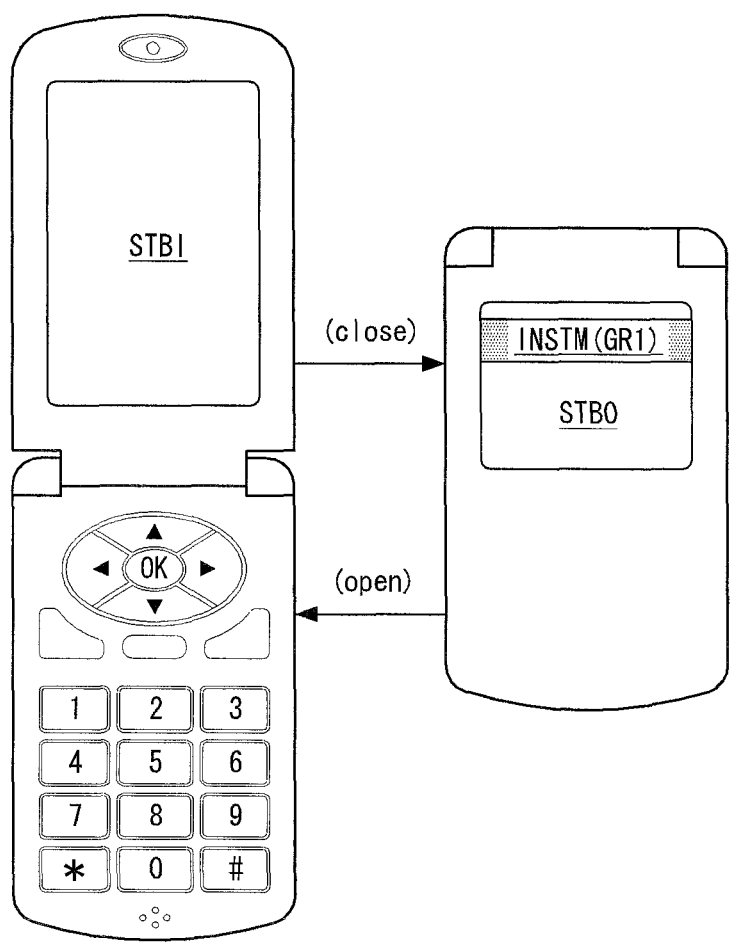
FIGS. 7A to 7C show instant messages displayed on an external display module of the mobile terminal.
Figure 7B:
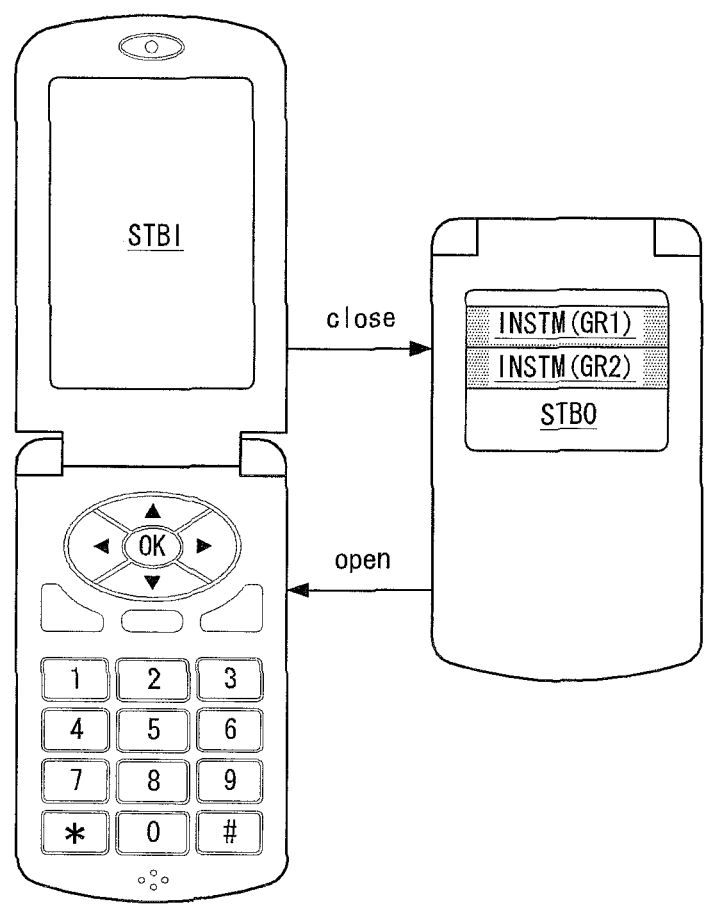
Figure 7C:
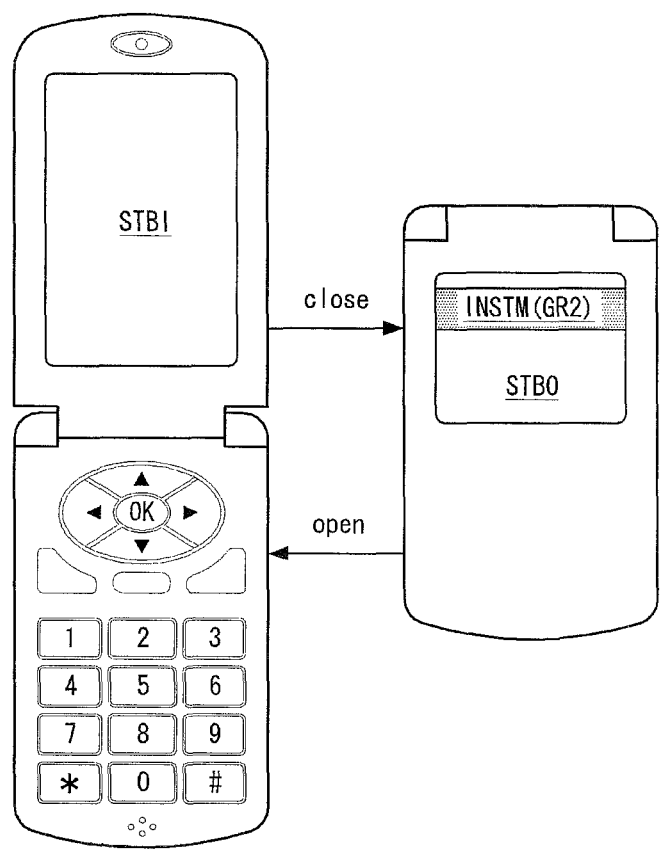

The control code may be included in the received message. The controller 180 may extract the control code from the received message and analyze the control code in order to determine a display position of the instant message. For example, depending on the control code, the instant message may be displayed on an idle screen (STB0) of an external display module in a previously designated display form, as shown in FIGS. 7A to 7C.

If the message sender does not belong to the instant message sender group designated by the user (as determined by operation S53), the controller 180 may recognize the received message as a general message, store the received message in the memory 160, and inform reception of the message by displaying an icon, etc. That is, in operation S60, the controller 180 may display the received message on the display module 151 in a general message form.

Figure 6A:
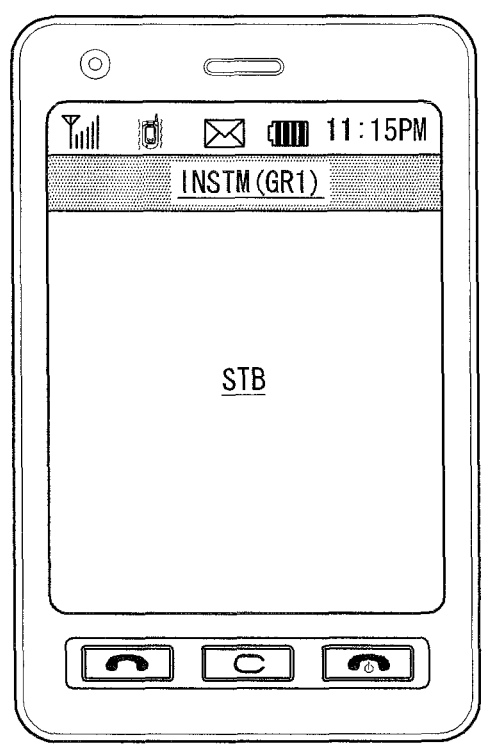
FIGS. 6A to 6C show instant messages on a display module of the mobile terminal.
Figure 6B:
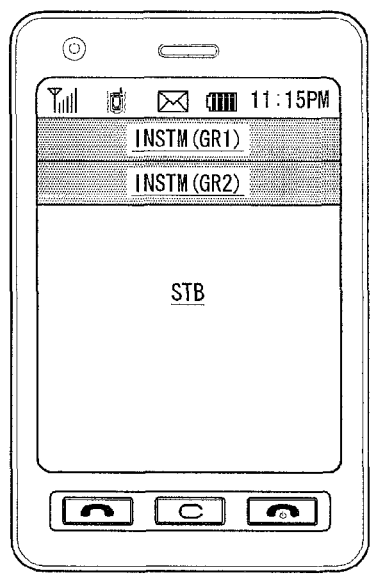
Figure 6C:
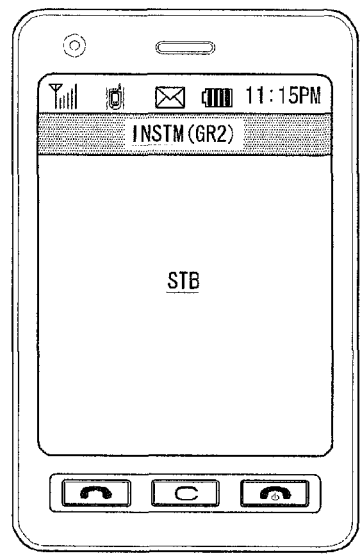

FIGS. 6A-6C show instant messages on a display module of the mobile terminal. FIGS. 7A-7C show instant message on an external display module of the mobile terminal. Other embodiments and configurations may also be provided.

FIG. 6A shows a first instant message INSTM(GR1) from a first instant message sender group displayed on screen STB. FIG. 6B shows that in addition to the first instant message, a second instant message INSTM(GR2) from a second instant message sender group may also be displayed on the screen STB. FIG. 6C shows that the first instant message has been deleted from the screen STB due to expiration of the display duration.

FIG. 7A shows a first instant message INSTM(GR1) from a first instant message sender group displayed on screen STB0 of an external display module. FIG. 7B shows that in addition to the first instant message, a second instant message INSTM(GR2) from a second instant message sender group may also be displayed on the screen STB0 of the external display module. FIG. 7C shows that the first instant message has been deleted from the screen STB0 due to expiration of the display duration of the external display module.

An instant message received from a sender who belongs to a first instant message sender group may be displayed on the idle screen STB, STB0 as shown in FIGS. 6A and 7A. If the display duration of the instant message has not exceed a specific duration and the mobile terminal receives a new instant message from a sender who belongs to a second instant message sender group, then the instant messages INSTM(GR1), INSTM(GR2) of the different groups may be displayed on the idle screens STB, STB0 at a same time as shown in FIGS. 6B and 7B. The first instant message INSTM(GR1) from the sender belonging to the first instant message sender group and the second instant message INSTM(GR2) received from the sender belonging to the second instant message sender group may have display positions separated from each other and/or have different background colors. If the display duration of the first instant message INSTM(GR1) displayed on the idle screens STB, STB0 exceeds a specific duration of time, then the first instant message INSTM(GR1) may disappear from the idle screen (S57, S58) as shown in FIGS. 6C and 7C, and the second instant message INSTM(GR2) whose display duration has not exceeded a specific duration may continue to be displayed on the idle screens STB, STB0.

As described above, a telephone directory group selected by a user may be designated as an instant message sender group. Accordingly, a message to be displayed in an instant message form can be easily selected, and a display position and a display form of an instant message can be controlled based on a user's choice.

The method of controlling instant messages may be recorded on a computer-readable recording medium as a program that may be executed in a computer.

The method of controlling instant messages may be executed in and by software. When the method is executed in software, constituent elements may be code segments that execute necessary tasks. The program or code segments may be stored in a processor-readable medium or may be transmitted through a transfer medium or a computer data signal combined with carriers in a communication network.

The computer-readable recording medium may include all kinds of recording devices in which data capable of being read by a computer system is stored. For example, the computer-readable recording medium may include ROM, RAM, CD-ROM, DVD-ROM, DVD-RAM, magnetic tapes, floppy disks, hard disks, optical data storages, etc. The computer-readable recording medium may also have its codes that are distributed into computer apparatuses connected over a network and readable by computers in a distributed manner, stored and/or executed.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling instant messages, the method comprising:
    receiving a first message at a mobile terminal, wherein the mobile terminal is a folder-type body that includes an external display module located on an outer surface of the body and an internal display module located on an inner surface of the body, the folder-type body being capable of changing between an open state and a closed state;
    searching a telephone directory for determining a first instant sender group of the received first message, wherein the first instant message corresponds to a first instant sender group designated within the telephone directory that is stored in memory of the mobile terminal, wherein the memory stores information to associate one of the external display module and the internal display module with the first instant sender group, and to associate the other one of the external display module and the internal display module with the second instant sender group;
    determining one of the external display module and the internal display module to display the received first message based on the stored information corresponding to the first instant sender group;
    displaying the first instant message only on the determined one of the external display module and the internal display module for a first duration of time that is determined by the mobile terminal, in a first display form preset by the mobile terminal;
    receiving a second instant message while displaying the first instant message, wherein the second instant message corresponds to a second instant sender group designated within the telephone directory;
    determining the other one of the external display module and the internal display module to display the received second message based on the stored information corresponding to the second instant sender group;
    displaying the second instant message only on the determined other one of the external display module and the internal display module in a second display form preset by the mobile terminal, when the first instant message and the second instant message belong to different sender groups; and
    removing the displayed first instant message when the first duration of the displayed first instant message has elapsed,
    wherein the first and the second display form comprises at least one of a color of background displaying message, a font of text and a color of text.

2. The method of claim 1, further comprising determining a control code based on the received first and second instant message.

3. The method of claim 2, wherein displaying the first instant message includes determining a display position of the first and second instant message based on the determined control code, and displaying text contents of the first instant message at the determined display position.

4. The method of claim 1, further comprising selecting the first duration of time to display the first instant message.

5. The method of claim 1, further comprising designating a display position in which to display the first and second instant message.

6. The method of claim 1, further comprising designating a display form for the first and second instant message.

7. The method of claim 6, wherein designating the display form includes designating at least one of a background color, a degree of background transparency, and a text motion of the instant message.

8. A mobile terminal comprising:
    a folder-type body that includes an external display module located on an outer body surface and an internal display module located on an inner body surface, wherein a state of the folder-type body is one of an open state or a closed state;
    a wireless communication unit to receive messages;
    a memory to store a telephone directory and information about at least one instant message sender group, wherein the memory to store information to associate one of the external display module and the internal display module with a first instant message sender group, and to associate the other one of the external display module and the internal display module with a second instant message sender group;
    a controller configured to search the telephone directory for determining a first instant message sender group of a received first instant message, and the controller configured to determine first one of the external display module and the internal display module based on the stored information corresponding to the first instant message sender group, and to display the first instant message only on the determined one of the external display module and the internal display module for a first duration of time that is controllable by the mobile terminal, in a first display form preset by the mobile terminal, and the controller to search the telephone directory for determining a second instant message sender group of a second instant message while displaying the first instant message and to determine the other one of the external display module and the internal display module based on the stored information corresponding to the second instant message sender group and to display the second instant message only on the determined other one of the external display module and the internal display module in a second display form preset by the mobile terminal, wherein the second instant message corresponds to the second instant message sender group designated within the telephone directory; and a display module, under control of the controller, to display the first instant message for the first duration of time and to remove the first instant message when the first duration of time has lapsed, wherein the first display form comprises at least one of a color of background displaying message, a font of text and a color of text.

9. The mobile terminal of claim 8, wherein the controller to determine a control code based on the received first and second instant message.

10. The mobile terminal of claim 9, wherein the controller determines a display position of the first and second instant message on the screen based on the determined control code, and the controller displays the text contents of the first instant message at the determined display position.

11. The mobile terminal of claim 8, further comprising a user input unit to input the first duration of time to display the first instant message.

12. The mobile terminal of claim 8, further comprising a user input unit to input a display position in which to display the first and second instant message.

13. The mobile terminal of claim 8, further comprising a user input unit to input a display form of the first and second instant message.

14. The mobile terminal of claim 13, wherein the controller controls at least one of a background color, a degree of background transparency, and a text motion of the displayed first and second instant message, based on a user's input to the user input unit.

15. The mobile terminal of claim 13, wherein a display position and color of the displayed first instant message is different from a display position and color of the displayed second instant message.

16. A mobile terminal comprising:
a folder-type body that includes an external display module located on an outer surface of the folder-type body and an internal display module located on an inner surface of the folder-type body, the folder-type body to switch between an open state and a closed state;
a wireless communication unit to receive messages;
a memory to store a telephone directory and information about a first instant message sender group and a second instant message sender group, wherein the memory to store information to associate one of the external display module and the internal display module with a first instant message sender group, and to associate the other one of the external display module and the internal display module with the second instant message sender group;
a controller configured to search the telephone directory for determining a first instant sender group of a received first message, and the controller configured to determine one of the external display module and the internal display module based on the stored information corresponding to the first instant message sender group, and to display text contents of the first instant message only on the determined one of the external display module and the internal display module for a first duration of time, in a first display form preset by the mobile terminal, and the controller to search the telephone directory for determining a second instant message sender group of a received second message and to determine the received second message as a second instant message based on a result of the search while displaying the first instant message, and the controller configured to determine the other one of the external display module and the internal display module based on the stored information corresponding to the second instant message sender group and to display text contents of the second instant message only on the determined other one of the external display module and the internal display module in a second display form preset by the mobile terminal, wherein the second instant message corresponds to the second instant message sender group designated within the telephone directory, and the controller to control the display of the text contents of the second instant message while displaying the first instant message; and
a display module, under control of the controller, to simultaneously display the first instant message and the second instant message for the first duration of time and to remove the first instant message when the first duration of time has ended,
wherein the first display form comprises at least one of a color of background displaying message, a font of text and a color of text.

17. The method of claim 1, wherein the previously-stored settings are set by a user.

* * * * *